(12) United States Patent
Schwaibold et al.

(10) Patent No.: US 12,521,505 B2
(45) Date of Patent: Jan. 13, 2026

(54) VENTILATION SYSTEM COMPRISING AT LEAST ONE VENTILATOR AND AT LEAST ONE DIAGNOSIS DEVICE AND METHOD OF OPERATING

(71) Applicant: Loewenstein Medical Technology S.A., Luxembourg (LU)

(72) Inventors: Matthias Schwaibold, Karlsruhe (DE); Jan Verhoeven, Ettlingen (DE); Jochen Furthmueller, Rheinstetten (DE)

(73) Assignee: LOEWENSTEIN MEDICAL TECHNOLOGY S.A., Luxembourg (LU)

( * ) Notice: Subject to any disclaimer, the term of this patent is extended or adjusted under 35 U.S.C. 154(b) by 904 days.

(21) Appl. No.: 17/661,104

(22) Filed: Apr. 28, 2022

(65) Prior Publication Data

US 2022/0347411 A1 Nov. 3, 2022

(30) Foreign Application Priority Data

Apr. 30, 2021 (DE) .......................... 102021111291.5

(51) Int. Cl.
*A61M 16/00* (2006.01)
*A61B 5/087* (2006.01)
(Continued)

(52) U.S. Cl.
CPC .......... *A61M 16/024* (2017.08); *A61B 5/087* (2013.01); *A61M 16/0003* (2014.02);
(Continued)

(58) Field of Classification Search
CPC .......... A61M 16/0057; A61M 16/0066; A61M 16/024; A61M 16/0026;
(Continued)

(56) References Cited

U.S. PATENT DOCUMENTS

| 2011/0209704 A1* | 9/2011 | Jafari ................ A61M 16/0833 |
| | | 128/204.23 |
| 2014/0073889 A1* | 3/2014 | Su ........................ A61B 5/0205 |
| | | 600/324 |

(Continued)

FOREIGN PATENT DOCUMENTS

EP 1859733 A1 * 11/2007 ........... A61B 5/0205

OTHER PUBLICATIONS

English language machine translation of EP-1859733-A1.*

*Primary Examiner* — Joseph D. Boecker
(74) *Attorney, Agent, or Firm* — Abel Schillinger, LLP

(57) ABSTRACT

Ventilation system (having a ventilator and having a diagnostic device, wherein the ventilator comprises a ventilation unit for generating a respiratory gas flow for ventilation and a detection unit (for detecting a ventilation signal characteristic for the respiratory gas flow over time. The diagnostic device comprises a sensor unit for detecting a diagnostic signal over time. The synchronization unit is operationally connected to the detection unit and the sensor unit and is suitable and configured for studying a time curve of the ventilation signal and a time curve of the diagnostic signal respectively for a signal change caused by the same event and bringing the curve of the ventilation signal and the curve of the diagnostic signal into chronological correspondence so that the event occurs simultaneously in both signal curves.

18 Claims, 3 Drawing Sheets

(51) Int. Cl.
*G16H 20/40* (2018.01)
*G16H 40/63* (2018.01)

(52) U.S. Cl.
CPC ........ *A61M 16/0057* (2013.01); *G16H 20/40* (2018.01); *G16H 40/63* (2018.01); *A61M 2016/0027* (2013.01); *A61M 2016/0033* (2013.01); *A61M 2205/502* (2013.01); *A61M 2205/52* (2013.01); *A61M 2230/04* (2013.01); *A61M 2230/205* (2013.01); *A61M 2230/30* (2013.01); *A61M 2230/40* (2013.01); *A61M 2230/60* (2013.01); *A61M 2230/62* (2013.01)

(58) Field of Classification Search
CPC .. A61M 2016/0027; A61M 2016/0033; A61M 2205/502; A61M 2205/52; A61M 2230/005; A61M 2230/04; A61M 2230/08; A61M 2230/202; A61M 2230/205; A61M 2230/30; A61M 2230/40; A61M 2230/60; A61M 2230/62; A61M 2230/63; A61B 5/087; G16H 20/40

See application file for complete search history.

(56) References Cited

U.S. PATENT DOCUMENTS

2018/0221608 A1* 8/2018 Schwaibold ........ A61M 16/024
2018/0344194 A1* 12/2018 Eger ................... A61B 5/4836

* cited by examiner

VENTILATION SYSTEM COMPRISING AT LEAST ONE VENTILATOR AND AT LEAST ONE DIAGNOSIS DEVICE AND METHOD OF OPERATING

CROSS-REFERENCE TO RELATED APPLICATIONS

The present application claims priority under 35 U.S.C. § 119 of German Patent Application No. 102021111291.5, filed Apr. 30, 2021, the entire disclosure of which is expressly incorporated by reference herein.

BACKGROUND OF THE INVENTION

1. Field of the Invention

The present invention relates to a ventilation system having at least one ventilator and having at least one diagnostic device and a method for operating such a ventilation system. The ventilator comprises at least one ventilation unit for generating a respiratory gas flow for a ventilation and at least one detection unit for detecting at least one ventilation signal characteristic of the respiratory gas flow over time. The diagnostic device comprises at least one sensor unit for detecting at least one diagnostic signal over time.

2. Discussion of Background Information

Such ventilation systems are typically used for therapy supervision. In general, the patient uses the ventilator over a longer time period, for example, in the context of a sleep therapy. For the therapy supervision, the diagnostic device is then additionally provided, to detect the condition of the patient directly during the ventilation. The quality and effectiveness of the ventilation can thus be monitored and if needed the ventilation settings can be deliberately adapted to the needs of the patient.

In the context of therapy supervision, in addition to the parameters detected in any case using the ventilator, many further variables are therefore additionally often also measured and recorded by the sensors of the diagnostic device. For informative and reliable therapy supervision, it is particularly decisive to relate and compare the signals of the ventilator to the signals of the diagnostic device. It is indispensable here that the signals from the ventilator chronologically correspond or are synchronous with those from the diagnostic device.

However, such a synchronization of the data detected in the context of the therapy supervision is linked to significant effort. Therefore, such therapy supervisions are often carried out in a sleep laboratory, which has an extensive network in which the sensors of the ventilator and the diagnostic device are interconnected with one another. All detected data can thus be centrally stored simultaneously. However, visiting a sleep laboratory often represents an exhausting and unpleasant effort for the patient. Moreover, the data obtained in the sleep laboratory sometimes do not reflect the actual ventilation situation of the patient due to the unfamiliar sleep situation.

Therefore, the therapy supervision is also taking place more and more often in the case of home ventilation in that a diagnostic device is entrusted to the patient for one or more nights. Subsequently, the data have to be read out from the diagnostic device and also from the ventilator and synchronized in complex work by technical personnel.

To simplify the synchronization, the internal clocks of diagnostic device and ventilator could be used. However, this has proven to be inadequate for automated synchronization, since the internal clocks of ventilator and diagnostic device generally do not run sufficiently synchronously or an interfering speed difference results during the recording.

It would, therefore, be advantageous to have available a ventilation system which enables improved synchronization of the ventilation signal with the diagnostic signal in the context of a therapy supervision. In particular, the synchronization should be possible in an automated manner in such a way that the patient can remain at home or does not have to go to the sleep laboratory for the therapy supervision and complex evaluation by technical personnel can be omitted. At the same time, the ventilation system should preferably be technically or structurally uncomplicated and also reliably operable by untrained users.

SUMMARY OF THE INVENTION

The ventilation system according to the invention comprises at least one ventilator and at least one diagnostic device. The ventilator comprises at least one ventilation unit for generating a respiratory gas flow for a ventilation. The ventilator comprises at least one detection unit for detecting at least one ventilation signal over time, which is characteristic for the respiratory gas flow. The diagnostic device comprises at least one sensor unit for detecting at least one diagnostic signal over time. The ventilation system comprises at least one synchronization unit. The synchronization unit is operationally connected to the ventilator and in particular at least to its detection unit. The synchronization unit is operationally connected to the diagnostic device and in particular at least to its sensor unit. The synchronization unit is suitable and designed for the purpose of studying at least one time curve of the ventilation signal and at least one time curve of the diagnostic signal for at least one signal change caused in each case by the same event. In other words, the detection unit is suitable and designed in particular for the purpose of identifying a signal change in the time curve of the ventilation signal and a signal change in the time curve of the diagnostic signal, wherein the signal changes are caused or were caused by the same event. The synchronization unit is suitable and designed for the purpose of bringing the curve of the ventilation signal and the curve of the diagnostic signal (at least approximately) into chronological correspondence (synchrony) or synchronizing them, so that the event occurs (at least approximately) simultaneously in the curve of the ventilation signal and in the curve of the diagnostic signal.

The ventilation system according to the invention offers many advantages. The synchronization unit offers a significant advantage with its capability of finding signal changes in the ventilation signal and diagnostic signal which were triggered by simultaneous events. The synchronization can thus take place automatically, so that the therapy supervision can also take place comfortably at home and overall effort and costs can be saved for the evaluation. Moreover, the invention offers a technically or structurally uncomplicated and at the same time easy-to-operate option for automated synchronization. The patient can thus also carry out the therapy supervision using a provided diagnostic device at home alone. Furthermore, the invention offers particularly accurate or reproducible synchronization. For example, a judgment of the trigger behavior of the ventilator can thus even be carried out.

After the fully automatic synchronization, in one preferred embodiment, a manual fine adjustment can also be performed. This is helpful in particular if the signals used for the synchronization do not have sufficiently high chronological resolution or are offset slightly in relation to one another in time due to technical influences, for example, filtering or amplification. In this case, the evaluator can perform a correction after the automatic synchronization on the basis of his or her visual assessment. The correction of up to 10 seconds can typically be performed in steps of up to 0.5 seconds. For example, the correction of 5 seconds can be performed in steps of 0.1 second. The correction of 1 second can preferably be performed in steps of 0.05 seconds on the basis of his or her visual assessment. A large amount of time is thus still saved to compensate for the approximate offset of the signals, and nonetheless the precision of a visually determined adjustment can be achieved.

The synchronization unit is preferably suitable and designed for the purpose of recognizing at least one unique point in time in the time curve of the ventilation signal and in the time curve of the diagnostic signal by way of the signal changes which are caused by the same event and synchronizing the signal curves to this point in time. In particular, the point in time of the event is used as the reference point for synchronization. In particular, for the synchronization, the time axes in the time curves of the ventilation signal and the diagnostic signal are each brought into correspondence so that the signal changes originating from the same event are located at the same position on the time axis. In particular, the synchronization unit is suitable and designed for the purpose of synchronizing the signal curves with one another and preferably also analyzing them without synchronized clocks.

For example, the event is an occurrence of a dyspnea of the patient. For example, the dyspnea causes a pressure change and/or flow change in the signal curve of the ventilator. The diagnostic device detects, for example, the respiratory movements via a sensor fastened on the thorax, so that the dyspnea also causes a significant signal change in this signal. The two signal changes are thus based on the same event, namely the dyspnea. Since the dyspnea is the original cause of both signal changes, the signal curves can be reliably synchronized using the point in time of the dyspnea as the reference point. For this purpose, at least one time axis is shifted so that the signal changes caused by the dyspnea chronologically correspond.

In one advantageous refinement, the synchronization unit is suitable and designed for the purpose of ascertaining a measure of a similarity of the signal changes in the time curve of the ventilation signal and in the time curve of the diagnostic signal. The synchronization unit preferably determines as a function of the similarity whether or not the signal changes are based on the same event. This enables uncomplicated and simultaneously reliable finding of signal changes, which are then used as the reference point for the synchronization.

The ventilation signal and/or the diagnostic signal in particular each comprise at least one measured variable detected over time or are formed by such a variable. The signal change then comprises in particular at least one characteristic change of the measured variable or corresponds to such a change. Additionally or alternatively, the ventilation signal and/or the diagnostic signal can each also comprise at least one item of information added to or superimposed on the signal curve and uniquely identifiable as a signal change, which is in particular independent of the measured variable. Such an item of information is, for example, the synchronization signal generated by a user input (described hereinafter) or the time stamp (described hereinafter), which is generated by the arrival and/or dispatch of a data packet. Such items of information also enable a reliable synchronization and also achieve the object according to the invention particularly advantageously.

The measure of the similarity is in particular a duration and/or an intensity and/or a symmetry property. The measure of the similarity can also relate to rates of change and/or another suitable geometric structure of the signal change. The measure of the similarity can also relate to a frequency and/or regularity of the signal changes in the respective time curves.

It is preferred and advantageous that the synchronization unit is suitable and designed for the purpose of studying the time curve of the ventilation signal and the time curve of the diagnostic signal in each case for a plurality of signal changes. The signal changes are each based in pairs (thus respectively one signal change of the ventilation signal and respectively one signal change of the diagnostic signal) on the same event. In particular, at least two and preferably a plurality of paired signal changes are used for the synchronization. The synchronization unit is suitable and designed for the purpose of bringing the time curve of the ventilation signal and the time curve of the diagnostic signal into chronological correspondence at least partially also in consideration of all studied signal changes. The reliability of the synchronization can thus be checked and also significantly improved.

It is possible that a synchronization is discarded if a certain number of the studied signal changes cannot be brought into chronological correspondence in this case. In particular, a synchronization is confirmed or retained if all signal changes or at least a predominant part of the studied signal changes can thereby be brought into a plausible chronological correspondence. It is also possible that the signal changes which could not be brought into chronological correspondence upon completed synchronization are discarded and not used for the further analysis. Then in particular only those time intervals in the time curve are synchronized and in particular also further analyzed which are in the region of signal changes which are incorporated in a synchronization.

In particular, the synchronization unit is suitable and designed for the purpose of performing an evaluation of the ascertained synchrony and studying it with regard to how many of the signal changes found are included in a performed synchronization or fall out of it. In particular, if needed a renewed search for signal changes and/or a renewed synchronization can take place. It is also possible that a warning message is output that the reliability of the synchronization is below a threshold value.

Preferably, paired signal changes (based on the same event) are searched out in defined time ranges. In particular, the individual time ranges are spaced apart from one another. For example, the time ranges are spaced apart for 10 minutes or 30 minutes or one or more hours. Entire curves therefore do not always have to be compared to one another. If no suitable signal changes are found in the provided time ranges, these time ranges can be skipped or the intervals between the time ranges are decreased. It is also possible that the signal curves are searched through continuously for paired signal changes.

In particular, the time ranges comprise a therapy beginning and/or a therapy end and/or at least one therapy range lying chronologically in between. A longer course of therapy can thus also be synchronized with little studying effort.

Therapy beginning and/or therapy end comprise, for example, the first and last hour, respectively. It is also possible that a plurality of time ranges are provided between therapy beginning and therapy end, which are searched for signal changes based on the same event.

The time ranges preferably comprise at least 1 minute and at most 60 minutes and preferably 15 minutes +/−5 minutes. For example, the time ranges are spaced apart from one another by at least 15 minutes +/−5 minutes or also longer. Such time ranges enable the most extensive possible synchronization of the course of therapy and can be implemented at the same time with manageable analysis effort or computing effort.

The synchronization unit is preferably suitable and designed for the purpose of recognizing at least one signal change, which is based on an event which is taken from a group of event types, comprising: (acute) dyspnea (breathing interruptions, coughing), movement of the patient, slipped respiratory interface, leakage. Such events generally result in particularly characteristic and well identifiable signal changes in both signal curves. Other physiological event types or event types caused by the patient are also possible.

In one advantageous and preferred refinement, the synchronization unit is suitable and designed for the purpose of recognizing signal changes which are caused by at least two different event types. The reproducibility of the synchronization can thus be further improved. It can be provided that a plausibility check is carried out as to whether the signal changes of the individual event types result in a corresponding result of the synchronization or not.

The ventilation signal comprises in particular a measure of a flow of the respiratory gas and/or a measure of a pressure of the respiratory gas or is such a measure. The ventilation signal can also comprise a measure of a leak rate or can be formed as such. In particular, the ventilation signal is a therapy pressure and/or a respiratory flow. It is also possible that the ventilation signal comprises derivatives or other mathematical preparations of such a measure. In particular, the signal change in the time curve of the ventilation signal is a pressure change and/or a flow change and/or a change of the leak rate.

The diagnostic signal is preferably taken from a group of diagnostic signal types, comprising: blood gas sensor signals, ECG signals, EMG signals (for example, diaphragm EMG signals), induction plethysmography signals, blood pressure sensor signals, (structure-borne sound) microphone signals, body position sensor signals, acceleration sensor signals, temperature sensor signals, pressure and/or flow sensor signals, video signals, thermal imaging signals, radar signals, ultrasound signals. Such diagnostic signals enable an informative therapy supervision and are particularly advantageously suitable for analysis of signal changes in the context of the synchronization. The diagnostic signal can also correspond to the same type as the ventilation signal (for example, a therapy pressure or the therapy flow). The diagnostic device is in particular suitable and designed for the purpose of detecting such diagnostic signals. It is advantageous and preferred that at least two ventilation signal types characteristic for the respiratory gas flow are detectable using the detection unit. It is also preferred and advantageous that at least two diagnostic signal types are detectable using the sensor unit. At least one association of at least one ventilation signal type with at least one diagnostic signal type is preferably stored in the synchronization unit. The synchronization unit is preferably suitable and designed for the purpose of synchronizing a signal curve of a ventilation signal type with a signal curve of an associated diagnostic signal type according to the association. To detect the ventilation signal types or diagnostic signal types, in particular respective associated ventilation signals or diagnostic signals are detected. In particular, sensor means each intended for the various types are provided for detecting certain measured variables.

In one particularly advantageous refinement, it is provided that the event is at least one user input executed on the ventilator and/or on the diagnostic device. The event is preferably at least one user input executed simultaneously on the ventilator and the diagnostic device. In particular, at least one synchronization signal is generated by the user input. In particular, the synchronization signal is added to the ventilation signal and/or the diagnostic signal. In particular, the synchronization unit is suitable and designed for the purpose of recognizing the synchronization signal as a signal change in the time curve of the ventilation signal and/or in the time curve of the diagnostic signal and using this at least one signal change for the synchronization. The time curve of the measured variables is preferably not influenced by the synchronization signal so as not to influence the measurement result or the therapy supervision.

For example, the patient or a caregiver simultaneously actuates a user interface (for example, button or touchscreen) on the ventilator and on the diagnostic device. The synchronization signal is then generated by such an event and coupled into both signal curves. The synchronization unit then recognizes the synchronization signal as a signal change and uses it in the synchronization as a chronological reference point in the signal curves.

In the scope of the present invention, a signal curve is thus not only understood as a time curve of the variable measured by means of the sensor unit or detection unit, but rather in particular the information content registered over time. For example, the synchronization signal can be stored as an item of information in a file, in which the curve of the measured variables is also stored. In the scope of the present invention, a signal change is preferably understood as an identifiable marking in the signal curves, which marks a unique point in time in the signal curves. A signal change is also understood, for example, as an item of information deliberately added to a file, in which the signal curve is stored. However, the ventilation signal and/or the diagnostic signal can also each be designed so that it directly corresponds to the measurement signal detected by the detection unit or sensor unit or is derived therefrom.

An electronic and, for example, digital signal can be generated as a reaction to an event, for example a user input. Such a signal is then, for example, embedded in the signal curves and/or attached to the signal curves from the ventilator or diagnostic device. For example, the user input triggers a (digital) time stamp, which is identifiable in the respective signal curves and marks a unique point in time in the signal curves.

Data are preferably transferable and particularly preferably wirelessly transferable between the ventilator and the diagnostic device. The event is preferably a dispatch and/or an arrival of a data packet to be transferred. The synchronization unit is in particular suitable and designed for the purpose of synchronizing the signal curves under the assumption that the dispatch and the arrival of the data packet takes place simultaneously or has taken place under a defined time offset taken into consideration in the synchronization. In particular, the dispatch and the arrival of the data packet are registered in such a way that a unique point in time is defined via this. In particular, the point in time of the arrival of the data packet is registered by the device which receives the data packet. At the same time, this device also marks the point in time in its own signal curve. The synchronization unit can then synchronize the signal curves via this unique point in time. With a sufficiently stable or rapid data transfer, a reliable and uncomplicated synchronization is thus enabled.

For example, the diagnostic device sends its signal curves to the ventilator. The ventilator registers the reception point in time in the signal curve sent by the diagnostic device and in its own signal curve. Both signal curves thus receive a time stamp from the same clock, in the example thus the clock of the ventilator. Via such a time stamp, the synchronization unit can subsequently synchronize both signal curves deliberately and reliably with one another. The wireless transfer takes place, for example, by means of Bluetooth, WLAN, NFC, and/or another suitable transfer technology.

The synchronization unit is in particular suitable and designed for the purpose of taking into consideration a transfer quality of the data packet for the synchronization. For example, a transfer rate and/or a signal quality or the like is used for this purpose. The synchronization unit is in particular suitable and designed for the purpose of discarding the synchronization if the transfer quality is below a threshold value. It is also possible that a time offset between dispatch and arrival of the data packet is calculated depending on the transfer quality.

It is possible that the synchronization unit is suitable and designed for the purpose of deliberately manipulating the respiratory gas flow by means of the ventilation unit, so that at least one recognizable signal change occurs in each case in the time curve of the ventilation signal and in the time curve of the diagnostic signal, which is based on a simultaneous event caused by the manipulation of the respiratory gas flow. The manipulation comprises in particular at least one deliberate pressure change and/or flow change of the respiratory gas flow. In particular, the manipulation is an influence of the respiratory gas flow which is safe and unproblematic for the patient. In particular, the manipulation is not disadvantageous and in particular perceptible for the patient in the scope of the therapy. This enables a structurally uncomplicated and at the same time particularly reliably identifiable signal change and thus also a particularly accurate synchronization.

The applicant reserves the right to claim a ventilation system according to the preamble of claim 1, which is characterized in that it comprises a synchronization unit and is suitable and designed for the purpose of using at least one user input and/or at least one dispatch and arrival of a data packet being transferred and/or a deliberate manipulation of the respiratory gas flow for the synchronization. In particular, all implementations of the synchronization described here can each be implemented alternatively or in combination with one another.

The synchronization unit is in particular suitable and designed for the purpose of plotting the synchronized curves of the ventilation signal and the diagnostic signal on a common time axis and in particular providing them to at least one display unit and/or communication unit. The synchronization unit can be suitable and designed for the purpose of ascertaining at least one indicator for assessing the quality of the ventilation from the synchronized time curves. It is also possible that the synchronization unit outputs suggestions for changes and/or performs changes on the settings of the ventilation unit as a function of the indicator.

In all embodiments, it is preferred that the synchronization unit is integrated in the ventilator. In the context of a (home) therapy supervision, only a diagnostic device capable of coupling thus has to be provided, which itself does not require a synchronization unit. In particular, automatic coupling then takes place by switching on ventilator and diagnostic device. After a start of the respiratory therapy, the corresponding signal curves are then recorded and later or also simultaneously synchronized and in particular further evaluated by the synchronization unit. It is also possible and advantageous that the synchronization unit is integrated in the diagnostic device. In another advantageous embodiment, it can be provided that the synchronization unit is formed at least partially separately from the ventilator and the diagnostic device.

The sensor unit of the diagnostic device is in particular at least partially arrangeable on the body of the patient. In particular, the sensor unit comprises at least one electrode and at least one electrode holder. The diagnostic device can also comprise at least one user interface (interface) for the input of subjective and/or objective patient data. In particular, the sensor unit also comprises other types of sensor means.

The diagnostic device can comprise at least one effort belt and/or EIT belt and/or the like. Additionally or alternatively, a belt designed for induction plethysmography can be provided. The diagnostic device can comprise a diaphragm EMG device or can be designed as such. The sensor unit of the diagnostic device can be designed for contactless detection, for example, via thermal imaging, radar, and/or ultrasound. In particular, a variable characteristic of the breathing activity of the patient is measurable using the sensor unit of the diagnostic device.

The method according to the invention is used for operating a ventilation system as was described above. Such a method also particularly advantageously achieves the object stated above. In particular, the method is designed so that the ventilation system can also be operated in its embodiments accordingly.

The ventilator is in particular operable independently of the diagnostic device. In particular, the ventilator is also usable as intended for ventilation without the diagnostic device. The ventilator is in particular a home ventilator. However, it can also be designed as a clinical ventilator. The diagnostic device and the ventilator can be able to be coupled with one another directly and/or indirectly (for example, via the synchronization unit or an external device). The ventilator can be designed as a sleep therapy device and in particular as a CPAP device or autoCPAP device or also as a high-flow therapy device. The ventilator can also be designed as another ventilator type.

The diagnostic signal detected over time is stored in particular in a storage unit. The ventilation signal detected over time is stored in particular in a storage unit. Separate storage units or also an at least shared storage unit can be provided for this purpose. The shared storage unit is then associated, for example, with the synchronization unit or the ventilator or an external device.

The signal curves can relate directly to a sensorially detected variable (measured variable) or a variable derived from the detected variable. For the analysis to find the signal change, the signal curves can be used directly and/or their derivative and/or other mathematical preparations of the signal curves can be used.

In all embodiments, it is preferred and advantageous that the ventilation unit is activatable in consideration of the ventilation signal and/or the diagnostic signal. In particular, at least one control variable for the ventilation and/or at least one device function is settable in dependence on the ventilation signal and/or the diagnostic signal. In all embodiments, it is also preferred and advantageous that at least one control variable and/or at least one device function of the diagnostic device is settable in consideration of the ventilation signal and/or another control signal of the ventilator and/or in consideration of the diagnostic signal. In particular, the signals of the respective other device are received to control at least one function of the receiving device.

For example, the ventilator receives at least one signal from the diagnostic device. The following are possible
- for example, signals about the breathing activity to switch over from expiration pressure and inspiration pressure or continuous pressure profiles;
- for example, signals from an ECG or defibrillator or acceleration sensor to briefly interrupt the ventilation, for example, during defibrillation or reanimation;
- for example, signals about the breathing activity to control an auxiliary function synchronously with the respiratory phase, for example, oxygen admixture, air humidifying, nebulization, aerosol delivery;
- for example, vital signals to use the alarm system of the ventilator for physiological alarms with respect to the signals of the diagnostic device, which does not have a separate alarm system;
- for example, a plurality of signals of the diagnostic device to use the telemedicine data interface of the ventilator to transfer diagnostic data;
- for example, a plurality of signals of the diagnostic device to use the display device/display of the ventilator to display the diagnostic signals;
- for example, signals about the effectiveness of the ventilation, for example, synchrony or blood gases, to control ventilation parameters, for example, the height of the pressure levels, the inspiration time, the expiration time, or the sensitivity of the trigger.

For example, the diagnostic device receives signals from the ventilator. The following are possible
- for example, signals about the breathing activity for the respiratory phase to trigger an electrostimulation, for example, of breathing muscles, the heart, or muscles for opening the airways;
- for example, a plurality of signals of the ventilator to use the telemedicine data interface of the diagnostic device to transfer ventilation data;
- for example, a plurality of signals of the ventilator to use the display device/display of the diagnostic device to display the ventilation signals.

In particular, the above-mentioned exemplary signals represent ventilation signals or diagnostic signals.

The diagnostic device can also be a module having one or more sensors in the respiratory gas flow. The sensors in the respiratory gas flow can be configured, for example, to measure the O2 concentration and/or the CO2 concentration and/or the temperature and/or the absolute humidity and/or the relative humidity of the respiratory gas flow. The sensors in the respiratory gas flow can also be configured, for example, to measure volatile organic compounds, abbreviated VOCs, in the respiratory gas flow.

An evaluation according to respiratory phases, thus according to inspiration and expiration, can be enabled by the synchronization, for example. An evaluation according to parts of the respiratory phases, for example, the end of the expiration, can also be enabled by the synchronization.

In particular, the synchronization unit is suitable and designed for the purpose of executing the features formulated according to the method in the context of the provided description. In particular at least one algorithm is stored for this purpose in the synchronization unit. In particular, the synchronization unit comprises at least one electronic computer unit.

Further advantages and features of the present invention result from the description of the exemplary embodiments, which are explained hereinafter with reference to the appended figures.

DETAILED DESCRIPTION OF EXEMPLARY EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

Figure 1:
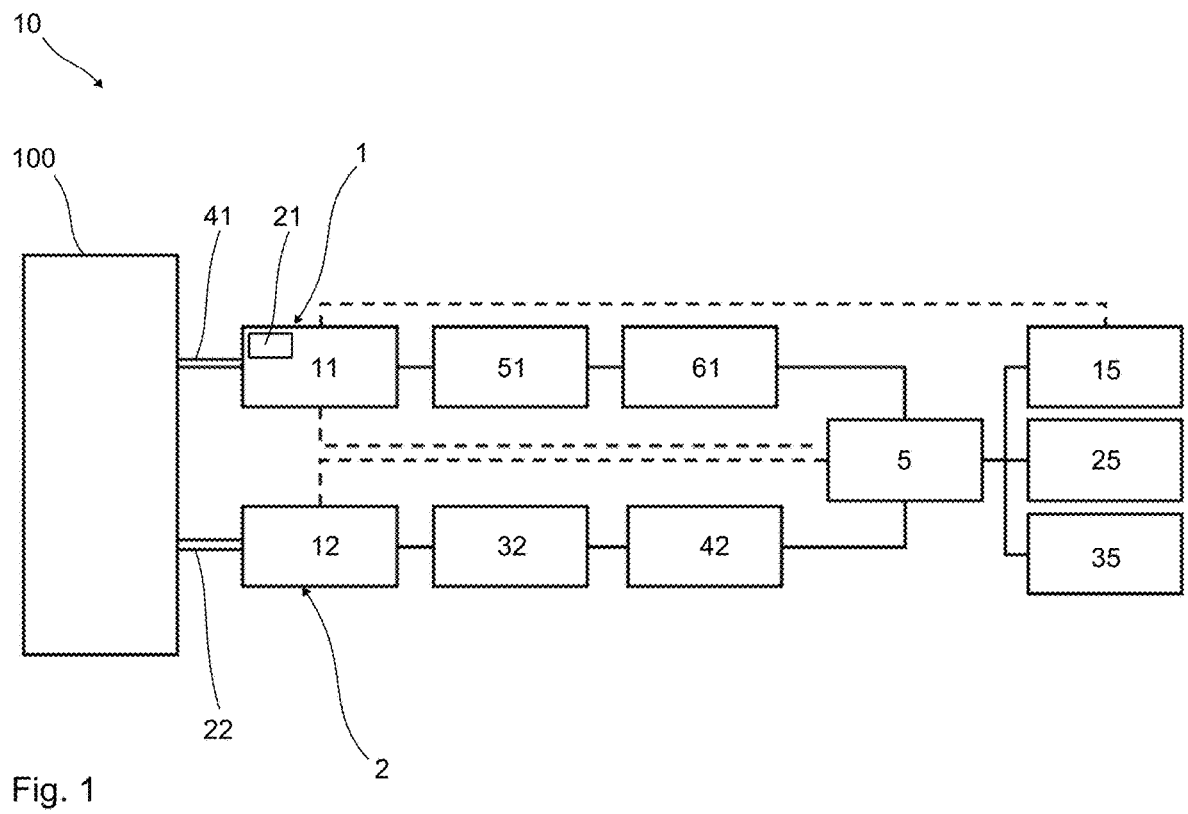
FIG. 1 shows a solely schematic illustration of a ventilation system according to the invention.

FIG. 1 shows a ventilation system 10 according to the invention having a ventilator 1 and a diagnostic device 2 coupled to the ventilator 1. The ventilation system 10 is operated according to the method according to the invention. The ventilator 1 has a ventilation unit 11, which generates a respiratory gas flow by means of a fan unit or a pressurized gas source and supplies it to the patient 100 for ventilation via a respiratory interface 41. The respiratory interface 41 is, for example, a breathing mask, which is connected via a hose unit to the ventilation unit 11.

Alternatively to the breathing mask, other patient interfaces can also be used, for example, a tracheostoma (or other invasive interface) or high-flow interface. The ventilation unit 11 can also be integrated in the mask. Optionally, a humidifier can be provided between ventilator 1 and patient 100 and/or a unit for introducing oxygen or aerosols and medications.

The ventilator 1 can be designed as noninvasive or invasive. These are also understood, for example, as devices 1 for sleep therapy (CPAP, autoCPAP, bilevel, ASV therapy) or nasal high-flow therapy. The device 1 also contains a user interface and terminals for power and connection to the patient 100 here.

Figure 3:
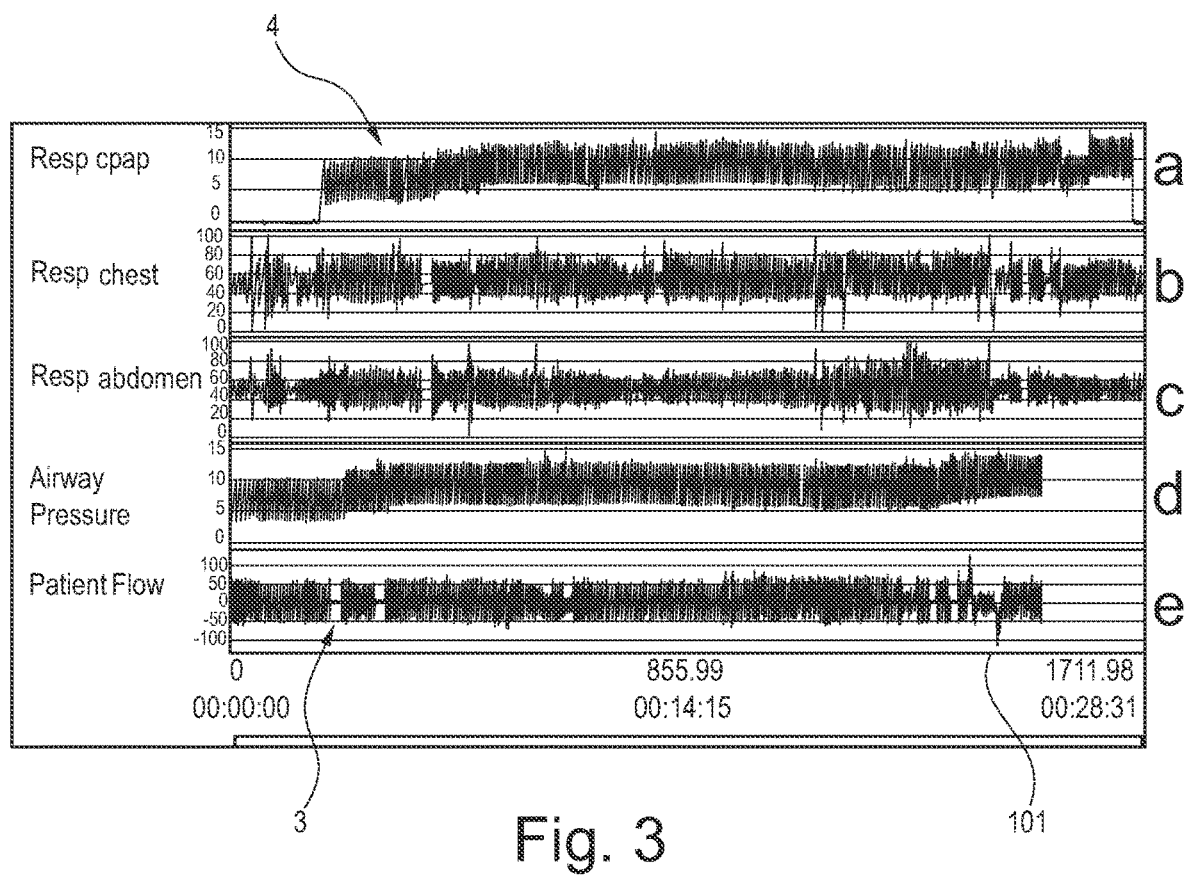
FIG. 3 shows a solely schematic plot of ventilation signals and therapy signals over time.

The ventilator 1 comprises a detection unit 21 having sensor means for detecting at least one ventilation signal 3 presented with reference to FIG. 3 over time. Preferably, ventilation signals 3 of two or more ventilation signal types 3 are detected. The ventilation signals 3 are characteristic for the respiratory gas flow and relate, for example, to at least one pressure signal and one flow signal. For example, the therapy pressure and the respiratory flow and a leak rate are continuously monitored in this way. Moreover, the ventilator 1 has a controller or a control unit here for processing the signals and controlling the ventilation unit 11.

The ventilation signal curves are registered here in a storage unit 51 arranged inside the ventilator 1. For example, a working memory, a permanent memory, and/or a portable storage medium are provided. The ventilation signals 3 are temporarily stored and provided with a time stamp according to an internal clock.

For this purpose, at least one internal clock (RTC) is provided. This internal clock can preferably be provided independently or partially independently of the time displayed on the user interface—so that the user or patient can set the time of day as he or she wishes, and the internal measurement behavior of the ventilator 1 and the entire system 10 is not dependent thereon.

The ventilator 1 is equipped here with a communication unit 61 for transferring the recorded signals 3. For example, the communication unit 61 comprises wired connections (serial, network, HL7, PDMS, I2C, USB, Firewire, etc.), mobile storage media (storage card, USB stick, etc.), wireless short-range communication (Bluetooth, infrared), wireless long-range communication (GSM, LPWA, 3G, 4G, 5G, directional radio, Sigfox, Lora). Additionally or alternatively, further processing of the data can at least partially take place in the ventilator 1 itself.

The diagnostic device 2 is used here to supervise the respiratory therapy. For this purpose, the diagnostic device 2 is operationally connected if needed to the ventilator 1, so that parameters can be detected during the therapy which then permit an assessment of the therapy quality. For this purpose, the diagnostic device 2 comprises a sensor unit 12 here for detecting diagnostic signals 4 of various diagnostic signal types, which are registered in a storage unit 32 of the diagnostic device 2 over time. The diagnostic signals 4 are presented in more detail with reference to FIG. 3. The diagnostic signals 4 are temporarily stored and can be provided with a time stamp according to an internal clock.

For the connection to the patient 100, the diagnostic device 2 comprises multiple diagnostic interfaces 22, of which only one is shown here as an example. The diagnostic interfaces 22 are provided by sensors of the sensor unit 12. For example, the sensor unit 12 comprises electrodes, effort belts, EIT belts, sensors for measuring blood gases, structure-borne sound microphones, location sensors, acceleration sensors, pressure or flow sensors, temperature sensors, blood pressure sensors, ECG sensors, EMG sensors, optical sensors, electrical sensors, and chemical sensors. Additionally or alternatively to an effort belt, a belt designed for induction plethysmography can be provided. Moreover, a reception of images (video camera) or speech (microphone) can be provided. A user interface can also be provided for the input of values, e.g., filling out questionnaires on symptoms, quality-of-life, side effects, and problems.

The diagnostic device 2 can have a user interface for further inputs/outputs, terminals for power and connection to the patient 100, a battery, an accumulator, a controller or a control unit for processing the signals 4 and/or controlling the components of the diagnostic device 2, and/or at least one internal clock (RTC).

The diagnostic device 2 is equipped here with a communication unit 42 for transferring the recorded signals 4. The communication unit 42 is designed, for example, like the communication unit 61 of the ventilator 1. Additionally or alternatively, further processing of the data can at least partially take place in the diagnostic device 2 itself. The storage unit 32 of the diagnostic device 2 can also be designed like the storage unit 51 of the ventilator 1.

If needed, two or more diagnostic devices 2 can also be attached to the patient 100 and coupled to the ventilator 1.

To be able to evaluate the ventilation signals 3 and the diagnostic signals 4 for the therapy supervision, they generally have to be compared to one another. For this purpose, it is helpful and often also absolutely necessary to bring the signals 3, 4 into chronological correspondence (synchrony) or to synchronize them. After completed synchronization, then, for example, a physician and/or also an evaluation algorithm of the ventilation system 10 can recognize in the signal curves which special events have occurred in the breathing activity of the patient simultaneously with other occurrences, for example, with changes of the blood pressure or the heart rate or the like. In addition, a diagnosis can be made particularly reliably and the ventilation settings can be adapted better to the needs.

To execute the synchronization automatically, the ventilation system 10 comprises a synchronization unit 5, which is operationally connected to the ventilator 1 and the diagnostic device. In the example shown here, the synchronization unit 5 can exchange data for this purpose with the communication units 42, 61.

The synchronization unit 5 of the ventilation system 10 of FIG. 1 and its functionality are presented in more detail hereinafter with reference to FIGS. 2 to 5.

The synchronization unit 5 ascertains here, for example, at least once, ideally repeatedly, the time offset of the signals 3, 4 and corrects it so that these signals can subsequently be further processed or evaluated synchronously in time with an offset less than 1 second.

The synchronization unit 5 generates or receives a reference time signal (which can also be referred to as a data packet or time stamp) and transfers it in quasi-real-time according to the dashed lines in FIG. 1 at 11 and 12. The two devices 1, 2 use this reference signal to set their internal clock time (RTC). This is only possible if a permanent connection exists between the synchronization unit 5 and the devices 1, 2 in quasi-real-time. The event 6 is in such a case then the transfer of the data packet and the time of day connected thereto.

The synchronization unit 5 evaluates the time stamps of the individual devices 1, 2, ascertains the difference of the two, and corrects at least one of the time stamps in such a way that a time offset less than 1 second exists for the further processing of the signals 3, 4. For this purpose, a connection in quasi-real-time between the devices 1, 2 and the synchronization unit 5 is necessary at least once.

A signal 3, 4, for example, the therapy pressure, is recorded by both devices 1, 2. On the basis of a similarity analysis of the signal 3, 4, the synchronization unit 5 recognizes the time offset and corrects the time stamp of at least one of the two devices 1, 2 in such a way that the time offset is reduced to less than one second. The similarity analysis can be carried out, for example, by a correlation, a matching pursuit comparison, an equalization of the switching on and switching off times, or a minimization of the error sum or sum of the error squares.

An item of information, for example, the breathing activity, is recorded differently in both devices 1, 2, for example, by a flow sensor in the ventilator 1 and by an effort sensor in the diagnostic device 2. On the basis of a similarity analysis of the signal 3, 4, the synchronization unit 5 recognizes the time offset and corrects the time stamp of at least one of the two devices 1, 2 in such a way that the time offset is reduced to less than one second. The similarity analysis can be carried out, for example, by a correlation, a matching pursuit comparison, an equalization of the switching on and switching off times, or a minimization of the error sum or sum of the error squares. The phasing of the different respiration signals due to the different sensors used is recognized and corrected here. For example, the beginning of the inhalation corresponds to a local minimum in the effort signal and a zero crossing in the respiratory flow signal.

Both devices 1, 2 receive a time signal from a time generator, for example, via radio, at least once, preferably at regular intervals, and adjust their internal RTC clock accordingly.

The devices 1, 2 are connected to one another here in such a way that one of the two sends a time marker to the other device 1, 2 or the synchronization unit 5 at characteristic points in time, for example, upon beginning measurement, on the basis of which the time stamps can be compared and corrected.

The time offset often changes over time due to the different speeds of the internal clocks (RTC) of device 1 and 2. This is ideally also equalized. For this purpose, the difference between both time stamps is repeatedly carried out according to one of the mentioned methods and the rate differences are ascertained again to equalize them subsequently. Different numbers of sample values of the signals 3, 4 of the devices 1, 2 thus result. This is equalized, for example, by keeping a sample value or interpolation of sample values in such a way that the signals run synchronously in time following the synchronization unit 5 and again have equal numbers of sampling steps.

The synchronization unit 5 is equipped here with a regulating unit 15. This changes the operating state of the ventilator 1 based on the sum of the time-synchronous signals of both devices 1, 2. For example, on the basis of manual control or by an automatic controller which recognizes, for example, asynchrony on the basis of the effort signals of device 2 and the pressure signal of device 1 and changes the settings of the ventilation unit 11 based thereon, for example, the trigger sensitivity or the cycling sensitivity or the inspiration time or the expiration time, with the goal of improving the synchrony between ventilator 1 and patient 100. Alternatively, expirational or inspirational flow limitation can be recognized on the basis of effort signals or EMG signals or EIT signals in combination with the respiratory flow signal of the ventilator 1 and reduced by a change of at least one pressure level or at least one slope of the transition between inspirational and expirational pressure.

A display unit 25 displays the time-synchronous signals 3, 4 from ventilator 1 and diagnostic device 2.

A storage unit 35 stores the time-synchronous signals 3, 4 from ventilator 1 and diagnostic device 2. The storage unit 35 optionally sends the signals 3, 4 to a remote station, for example, a server or PC or a mobile terminal.

The synchronization unit 5 and in particular its components 15, 25, 35 can be integrated as modules individually or jointly in one of the two devices 1 or 2 or in a PC or server or mobile terminal or in an evaluation unit specially produced for this purpose.

Figure 2:
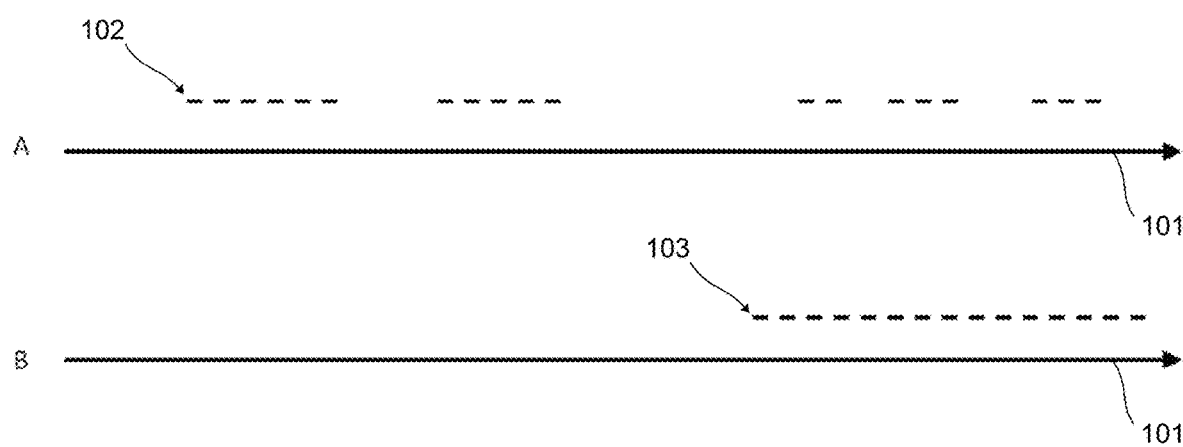
FIG. 2 shows a very schematic diagram having therapy phases and diagnostic phases.

An exemplary course of therapy having a therapy supervision is shown in FIG. 2. Therapy phases 102 (dashed lines) and sections without therapy (no dashed lines) are plotted over the time 101 on the axis A. The ventilator 1 typically remains on the patient 100 over a longer time period, at least several days, and therapy sessions take place repeatedly. In addition to the signal data, statistical data are also stored, e.g., usage duration per day or medians of respiratory frequency, leak, tidal volume, minute volume per day, or the number of events such as apnea or asynchrony per day or per hour.

Diagnostic phases 103 (dashed lines) carried out using the diagnostic device 2 and sections without diagnostic device 2 (no dashed lines) are plotted over the time 101 on the axis B. The diagnostic device 2 usually only remains for a shorter time for the therapy supervision with the patient 100. Often only for one day/one night or a few days and nights. Therefore, data on fewer therapy days are often in the memory 32 than in the ventilator 1. The starting and end times of the diagnostic measurements are typically not synchronous with the starting and end times of the therapy measurements. This can additionally be amplified by differently set internal clocks (RTC). Therefore, two time scales are also shown here. The data from the ventilators 1 are typically interrupted more often, for example, by trips to the toilet, than those of the diagnostic device 2, so that multiple measurement sections (or signal curves 3) of the one device 1 have to be connected to one measurement section (or signal curve 4) of the other device 2.

The synchronization unit 5 is capable here of processing, storing, and displaying the entirety of the stored information and using it as the basis for optimization of the ventilation settings. That is to say, for days lying further back, only statistical data and sometimes also signal data from the ventilator 1 are often provided, for the days of the therapy supervision, in addition also data from the diagnostic device 2. Signals 3, 4 are accordingly additionally processed and displayed for these days.

In FIG. 3, exemplary ventilation signals 3 and diagnostic signals 4 are plotted over the time 101, which were detected during a therapy supervision. The signals 3, 4 are in the original state here, thus not time-synchronous. The diagnostic signals 4 comprise three diagnostic signal types here: therapy pressure (a), effort belt thorax (b), effort belt abdomen (c). The ventilation signals 3 comprise two ventilation signal types here: therapy pressure (d), respiratory flow (e). It can be seen well from the two therapy pressure signals (a, d) that the recordings are shifted in relation to one another with respect to the time 101.

Figure 4:
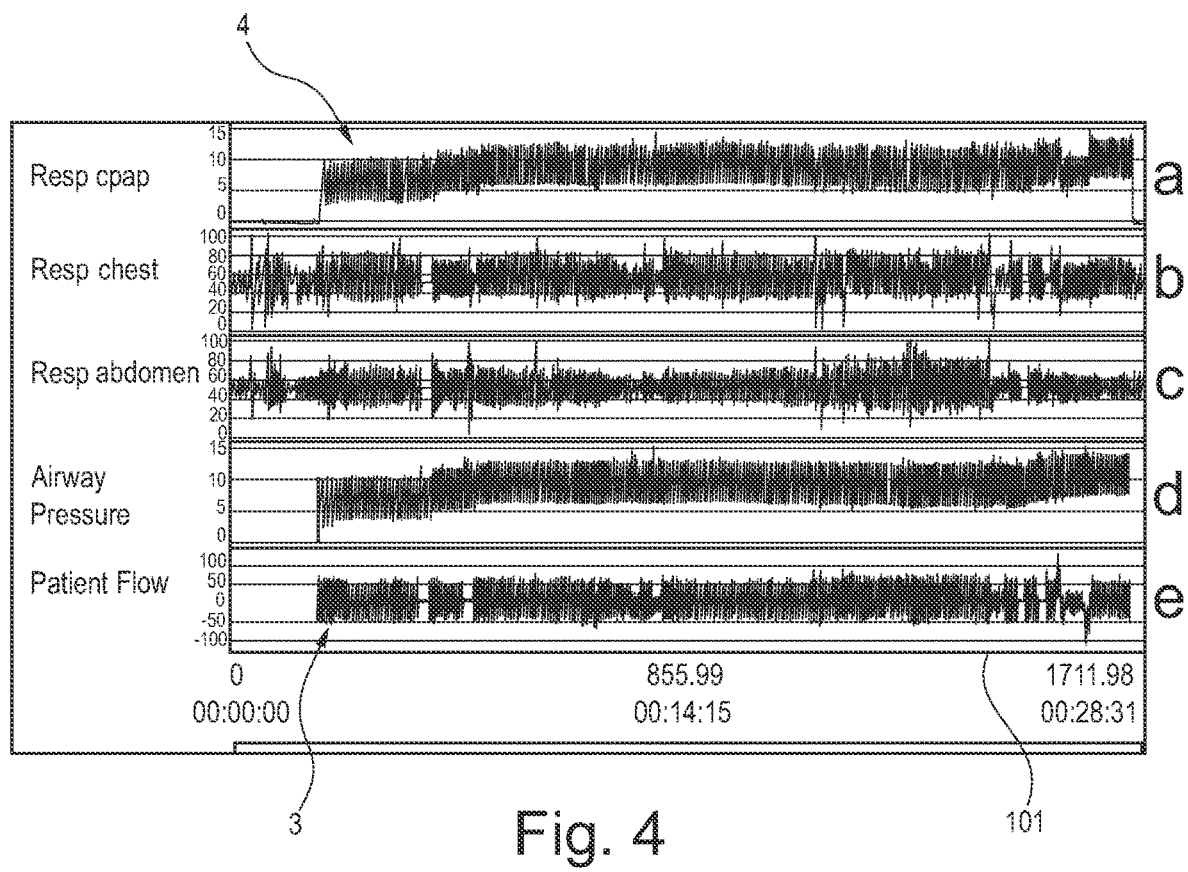
FIG. 4 shows a solely schematic plot of the ventilation signals and therapy signals from FIG. 3 after a synchronization carried out by the ventilation system.
Figure 5:
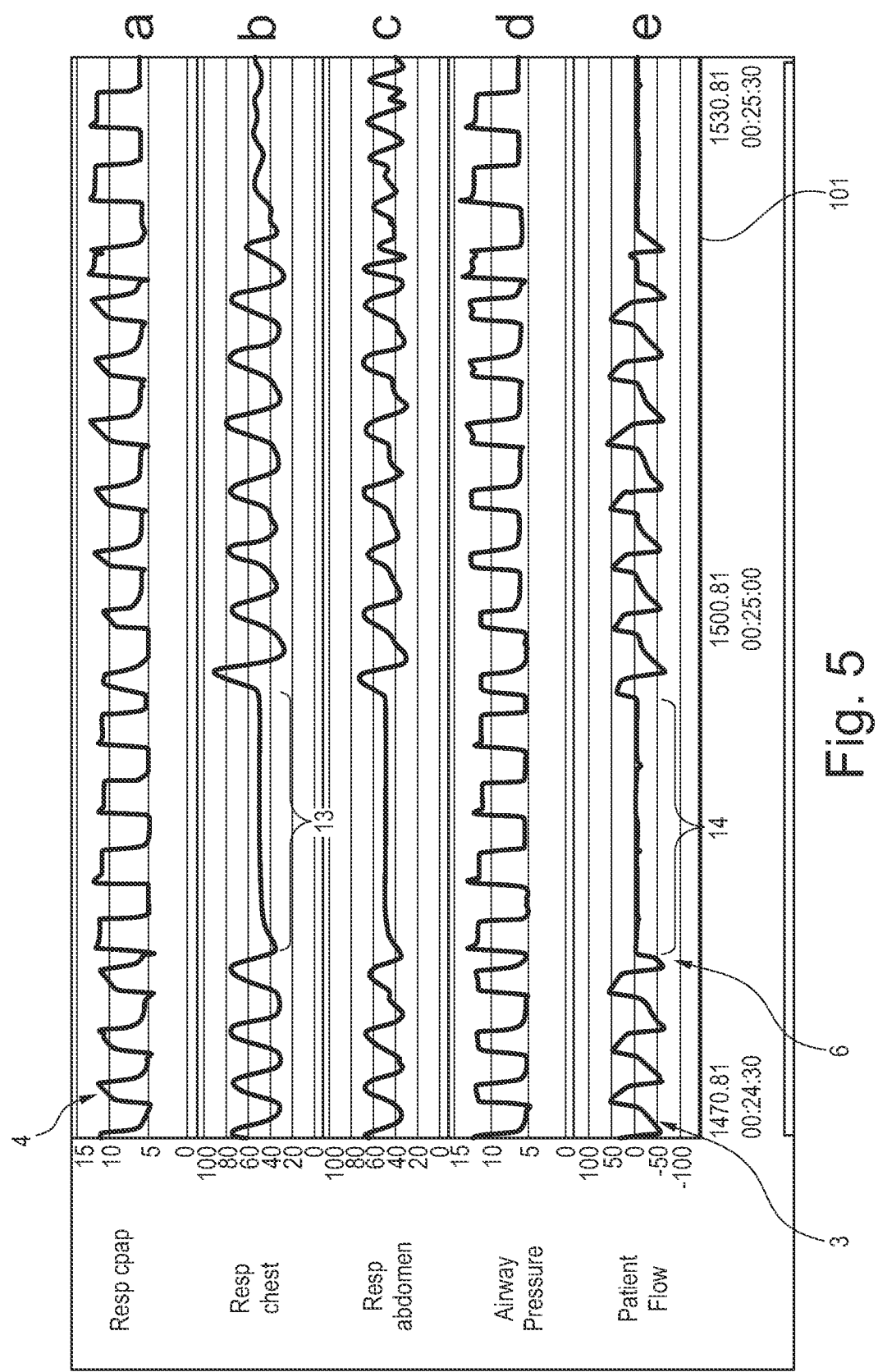
FIG. 5 shows an enlarged detail of the plot from FIG. 4.

FIG. 4 shows the ventilation signals 3 and diagnostic signals 4 of FIG. 3 after they have been synchronized by the synchronization unit 5. For better clarity, FIG. 5 shows a detailed enlargement of FIG. 4.

The ventilation signals 3 were shifted on the time axis here to run synchronously with the diagnostic signals 4. The correct chronological association can be seen particularly well particularly on the pressure curves (a, d). For the synchronization, however, the signal of the thorax effort belt (b) of the diagnostic device 2 and the respiratory flow signal (e) of the ventilator 1 were used here. In FIG. 5, the high level of time synchrony after the correction having a remaining offset less than 1 second can be seen well.

For the synchronization shown here, the synchronization unit 5 has identified signal changes 13, 14, which were caused by the same event 6, in the time curve of the ventilation signal 3 and in the time curve of the diagnostic signal 4. Such signal changes 13, 14 are marked by way of example in FIG. 5 for the signal types b and e. In both signals, a significantly linear curve having a slope of approximately zero occurred due to the same event 6 (for example, dyspnea or a leak due to a mask leak). Beginning and end of the event 6 are to be identified clearly by the brief changes of the slope.

Starting from these signal changes 13, 14, the synchronization unit 5 has also brought the remaining curves of ventilation signals 3 and diagnostic signals 4 into chronological correspondence. A comparison of other signal changes 13, 14 in the curve and, for example, the maxima and minima shows that these are also in very accurate correspondence. The synchronization is plausible over the entire curve.

For the synchronization, the synchronization unit 5 can also deliberately search for signal changes 13, 14 which originate from events other than the above-described events 6. For example, the ventilation signals 3 and/or diagnostic signals 4 can be assigned signal changes 13, 14 during their recording, which are triggered by a user input on the devices 1, 2. A synchronization signal can thus be added to each of the signal curves from both devices 1, 2 by the user input, which marks a unique point in time. For example, signal changes (for example time stamps) can also be deliberately generated by the dispatch and/or arrival of the transferred data packets with the signals 3, 4, which the synchronization unit 5 then searches out for synchronization and uses as reference points. Such signal changes 13, 14 are not shown here and can be embedded, for example, in a file of the signal curve.

LIST OF REFERENCE SIGNS 1 ventilator
2 diagnostic device
3 ventilation signal
4 diagnostic signal
5 synchronization unit
6 event
10 ventilation system
11 ventilation unit
12 sensor unit
13 signal change
14 signal change
15 regulation unit
21 detection unit
22 diagnostic interface
25 display unit
32 storage unit
35 storage unit
41 respiration interface
42 communication unit
51 storage unit
61 communication unit
100 patient
101 time
102 therapy phase
103 diagnostic phase

What is claimed is:

1. A ventilation system, wherein the ventilation system comprises at least one ventilator and at least one diagnostic device, the at least one ventilator comprising at least one ventilation unit for generating a respiratory gas flow for a ventilation and at least one detection unit for detecting at least one ventilation signal characteristic for the respiratory gas flow over time and the at least one diagnostic device comprising at least one sensor unit for detecting at least one diagnostic signal over time, and wherein at least one synchronization unit is operationally connected to the at least one detection unit and the at least one sensor unit, the at least one synchronization unit being suitable and configured for studying at least one time curve of the ventilation signal and at least one time curve of the at least one diagnostic signal respectively for at least one signal change caused by the same event and bringing the at least one time curve of the ventilation signal and the at least one time curve of the diagnostic signal into chronological correspondence so that the event occurs simultaneously in both signal curves, and wherein the at least one synchronization unit further is suitable and configured for studying the at least one time curve of the ventilation signal and the at least one time curve of the diagnostic signal respectively for a plurality of signal changes which are each based in pairs on the same event and bringing the at least one time curve of the ventilation signal and the at least one time curve of the diagnostic signal into chronological correspondence at least partially also in consideration of the plurality of signal changes, and wherein the at least one synchronization unit further is suitable and configured for recognizing signal changes which are caused by two different event types, and for carrying out a plausibility check as to whether or not signal changes caused by the two different event types result in a matching result of a synchronization to thereby improve a reproducibility of the synchronization.

2. The ventilation system of claim 1, wherein the at least one synchronization unit is suitable and configured for recognizing at least one unique point in time in the at least one time curve of the at least one ventilation signal and in the at least one time curve of the at least one diagnostic signal by way of the signal changes which are caused by the same event and synchronizing the signal curves to this point in time.

3. The ventilation system of claim 1, wherein the at least one synchronization unit is suitable and configured for ascertaining a measure of a similarity of the signal changes in the at least one time curve of the ventilation signal and in the at least one time curve of the at least one diagnostic signal and determining in dependence on the similarity whether or not the signal changes are based on the same event.

4. The ventilation system of claim 3, wherein a measure of the similarity includes a duration and/or an intensity and/or a symmetry property.

5. The ventilation system of claim 1, wherein a search in defined time ranges for paired signal changes is carried out by the at least one synchronization unit.

6. The ventilation system of claim 5, wherein the time ranges comprise a therapy start and a therapy end and at least one chronological therapy range lying in between.

7. The ventilation system of claim 5, wherein the time ranges comprise at least 1 minute and at most 60 minutes.

8. The ventilation system of claim 1, wherein the at least one synchronization unit is suitable and configured for recognizing the at least one signal change which is based on an event which is taken from event types comprising acute or chronic dyspnea (respiration interruption, coughing), movement of the patient, slipped respiratory interface, leak.

9. The ventilation system of claim 1, wherein the at least one ventilation signal comprises a measure of a flow of the respiratory gas and/or a measure of a pressure of the respiratory gas and/or a measure of a leak rate.

10. The ventilation system of claim 1, wherein the at least one sensor unit is capable of detecting a diagnostic signal taken from diagnostic signal types which comprise blood gas sensor signals, ECG signals, EMG signals, induction plethysmography signals, blood pressure sensor signals, (structure-borne sound) microphone signals, body position sensor signals, acceleration sensor signals, temperature sensor signals, pressure and/or flow sensor signals, video signals, thermal imaging signals, radar signals, ultrasonic signals.

11. The ventilation system of claim 1, wherein at least two ventilation signal types characteristic for the respiratory gas flow are detectable using the at least one detection unit and/or wherein at least two diagnostic signal types are detectable using the at least one sensor unit, and wherein an association of at least one ventilation signal type with at least one diagnostic signal type is stored in the at least one synchronization unit and the at least one synchronization unit is suitable and configured for synchronizing a signal curve of a ventilation signal type with a signal curve of an associated diagnostic signal type according to the association.

12. The ventilation system of claim 1, wherein the event is at least one user input on the at least one ventilator and/or on the at least one diagnostic device, at least one synchronization signal is generated by the at least one user input and added to the at least one ventilation signal and/or the at least one diagnostic signal, and the at least one synchronization unit is suitable and configured for recognizing the synchronization signal as a signal change and using it for the synchronization.

13. The ventilation system of claim 1, wherein data are transferable between the at least one ventilator and the at least one diagnostic device, the event is a dispatch and/or an arrival of a data packet to be transferred and the at least one synchronization unit is suitable and configured for synchronizing the signal curves under an assumption that the dispatch and the arrival of the data packet take place simultaneously or with a defined time offset taken into consideration in the synchronization.

14. The ventilation system of claim 13, wherein the at least one synchronization unit is suitable and configured for taking a transfer quality of the data packet into consideration for the synchronization.

15. The ventilation system of claim 1, wherein the at least one synchronization unit is suitable and configured for deliberately manipulating the respiratory gas flow by means of the at least one ventilation unit, so that at least one recognizable signal change respectively occurs in the at least one time curve of the at least one ventilation signal and in the at least one time curve of the at least one diagnostic signal, which are based on a simultaneous event caused by the manipulation of the respiratory gas flow.

16. The ventilation system of claim 15, wherein the manipulation comprises at least one deliberate pressure change and/or flow change of the respiratory gas flow.

17. The ventilation system of claim 1, wherein the at least one synchronization unit is suitable and configured for plotting synchronized curves of the at least one ventilation signal and the at least one diagnostic signal on a common time axis.

18. The ventilation system of claim 1, the at least one sensor unit of the at least one diagnostic device is at least partially arrangeable on a body of a patient.

* * * * *